(12) United States Patent
Li et al.

(10) Patent No.: US 10,374,666 B2
(45) Date of Patent: Aug. 6, 2019

(54) METHOD AND APPARATUS FOR UE BEAMFORMING OPERATION IN A WIRELESS COMMUNICATION SYSTEM

(71) Applicant: ASUSTek Computer Inc., Taipei (TW)

(72) Inventors: Ming-Che Li, Taipei (TW); Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/671,494

(22) Filed: Aug. 8, 2017

(65) Prior Publication Data

US 2018/0048358 A1   Feb. 15, 2018

Related U.S. Application Data

(60) Provisional application No. 62/372,964, filed on Aug. 10, 2016.

(51) Int. Cl.
| | |
|---|---|
| *H04B 7/0426* | (2017.01) |
| *H04B 7/0404* | (2017.01) |
| *H04L 25/02* | (2006.01) |
| *H04B 7/06* | (2006.01) |
| *H04B 7/08* | (2006.01) |
| *H04W 16/28* | (2009.01) |

(52) U.S. Cl.
CPC ........... *H04B 7/043* (2013.01); *H04B 7/0404* (2013.01); *H04B 7/0617* (2013.01); *H04B 7/0695* (2013.01); *H04B 7/088* (2013.01); *H04L 25/0228* (2013.01); *H04W 16/28* (2013.01); *H04B 7/0857* (2013.01)

(58) Field of Classification Search
CPC .... H04B 7/043; H04B 7/0404; H04B 7/0617; H04B 7/0695; H04B 7/088; H04L 25/0228; H04W 16/28
See application file for complete search history.

(56) References Cited

U.S. PATENT DOCUMENTS

| | | |
|---|---|---|
| 2013/0155847 A1 | 6/2013 | Li |
| 2014/0307654 A1 | 10/2014 | Kim |
| 2015/0009968 A1* | 1/2015 | Yu .......................... H04L 5/0053 370/336 |
| 2015/0009984 A1* | 1/2015 | Jung ................. H04W 56/0055 370/350 |
| 2018/0310283 A1* | 10/2018 | Deenoo ............... H04W 72/042 |

OTHER PUBLICATIONS

European search report from corresponding EP Appiication No. 17185306.2, dated Dec. 5, 2017.

* cited by examiner

*Primary Examiner* — Christopher M Brandt
(74) *Attorney, Agent, or Firm* — Blue Capital Law Firm, P.C.

(57) ABSTRACT

A method and apparatus are disclosed from the perspective of a UE capable of performing UE beamforming. In one embodiment, the method includes the UE receiving a control signaling on a first set of UE beam(s). In addition, the method includes the UE receiving a data transmission scheduled by the control signaling on a second set of UE beam(s), wherein the UE receives the data transmission with a time delay after receiving the control signaling.

12 Claims, 10 Drawing Sheets

(a) Digital beamforming (b) Analogue beamforming (c) Hybrid beamforming: Left = fully connected, Right = sub-array

METHOD AND APPARATUS FOR UE BEAMFORMING OPERATION IN A WIRELESS COMMUNICATION SYSTEM

CROSS-REFERENCE TO RELATED APPLICATIONS

The present Application claims the benefit of U.S. Provisional Patent Application Ser. No. 62/372,964 filed on Aug. 10, 2016, the entire disclosure of which is incorporated herein in its entirety by reference.

FIELD

This disclosure generally relates to wireless communication networks, and more particularly, to a method and apparatus for pathloss derivation for beam operation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment) capable of performing UE beamforming. In one embodiment, the method includes the UE receiving a control signaling on a first set of UE beam(s). In addition, the method includes the UE receiving a data transmission scheduled by the control signaling on a second set of UE beam(s), wherein the UE receives the data transmission with a time delay after receiving the control signaling.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; RP-150465, "New SI proposal: Study on Latency reduction techniques for LTE", Ericsson and Huawei; R2-162251, "RAN2 aspects of high frequency New RAT", Samsung; and TS 36.213 v 13.1.1, "E-UTRA Physical layer procedures (Release 13)." The standards and documents listed above are hereby expressly incorporated by reference in their entirety.

Figure 1:
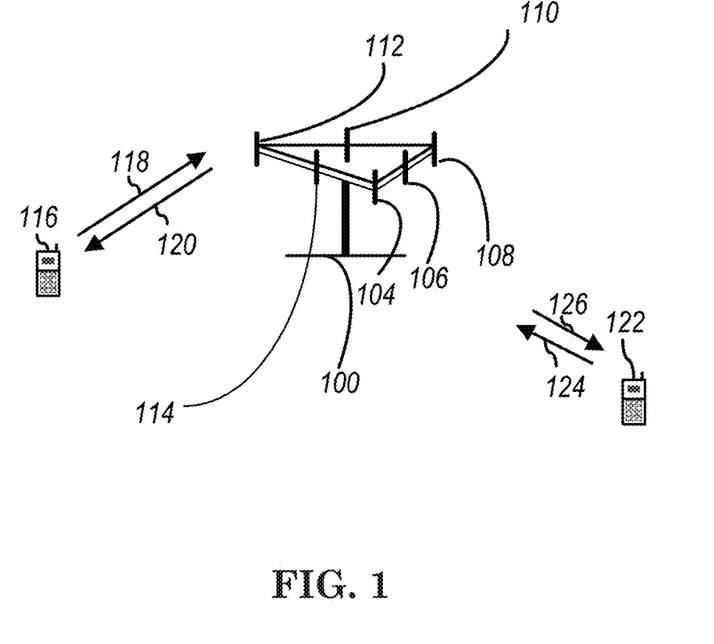
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122.

Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
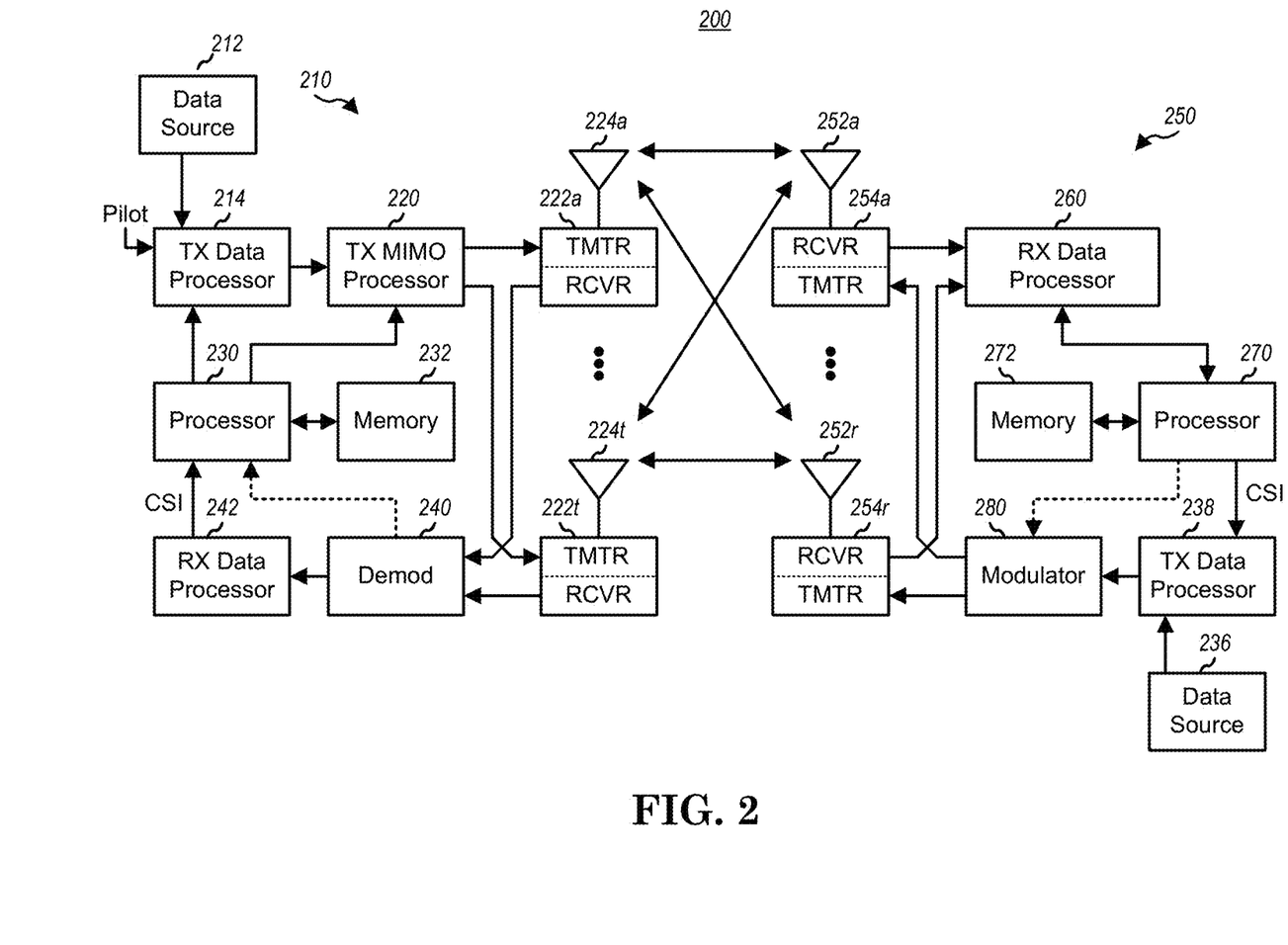
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
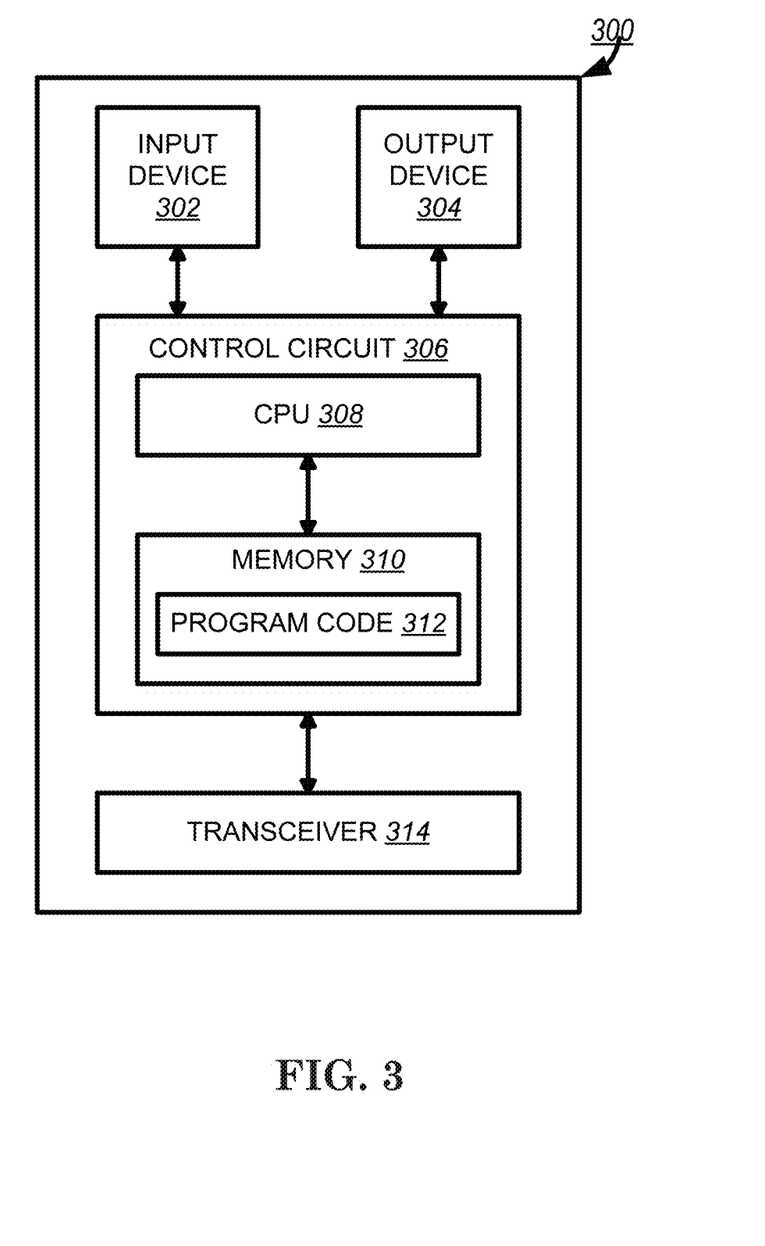
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
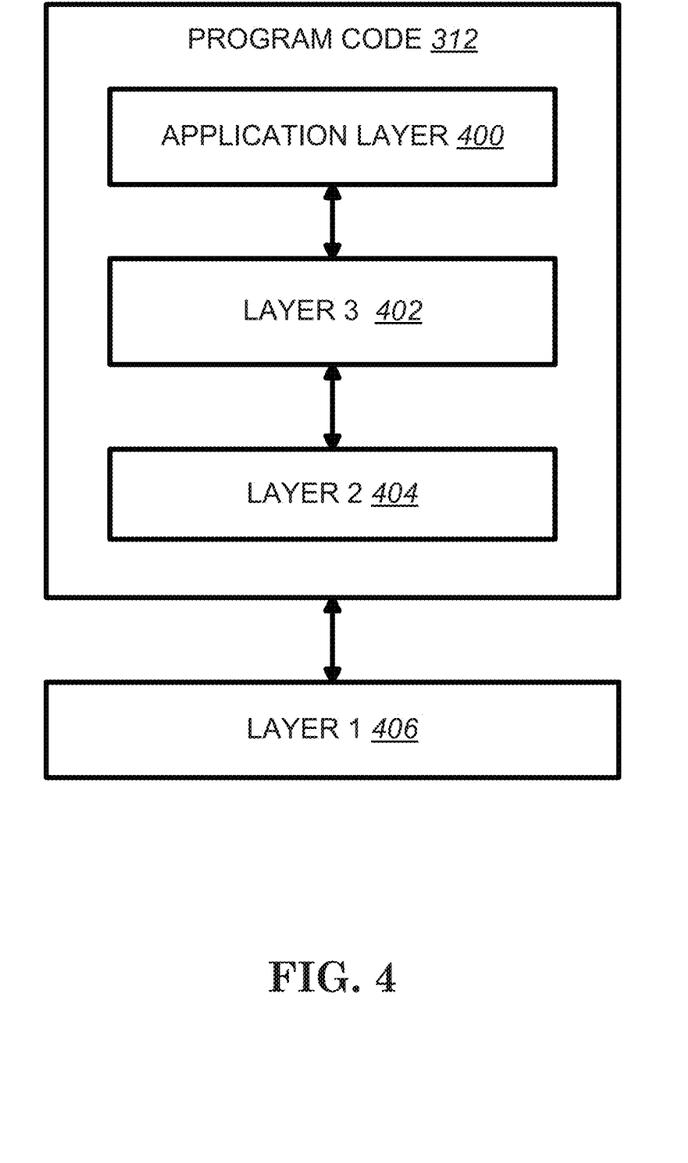
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g., current LTE bands <6 GHz), the required cell coverage may be provided by forming a wide sector beam for transmitting downlink common channels. However, in utilizing wide sector beam on higher frequencies (>>6 GHz), the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

Because the high gain beams are narrow compared to a wide sector beam, multiple beams for transmitting downlink common channels are needed to cover the required cell area. The number of concurrent high gain beams that an access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is generally a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e., the weighting of each antenna element can be controlled by baseband (e.g., connected to a TXRU (Transceiver Unit)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

Figure 5:
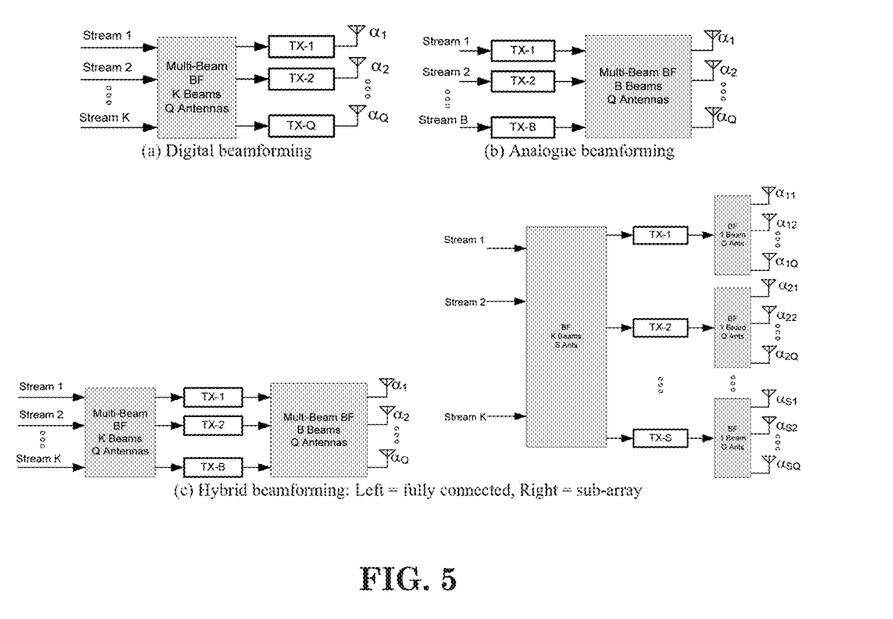
FIG. 5 is a diagram according to one exemplary embodiment.

For analog beamforming, the beam is generated on the analog domain, i.e., the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beam generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain. The three types of beamforming is shown in FIG. 5.

As discussed in 3GPP R2-162709, an eNB (evolved Node B) may have multiple TRPs (either centralized or distributed). Each TRP (Transmission/Reception Point) can form multiple beams. The number of beams and the number of simultaneous beams in the time/frequency domain depend on the number of antenna array elements and the RF at the TRP.

Potential mobility type for NR can be listed as follows:
Intra-TRP mobility
Inter-TRP mobility
Inter-NR eNB mobility As discussed in 3GPP R2-162762, reliability of a system purely relying on beamforming and operating in higher frequencies might be challenging, since the coverage might be more sensitive to both time and space variations. As a consequence of that the SINR (Signal-to-Interference-and-Noise Ratio) of that narrow link can drop much quicker than in the case of LTE.

Using antenna arrays at access nodes with hundreds of elements, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

In RAN1 #85 meeting, some agreements about beamforming are as follows:
Following three implementations of beamforming are to be studied in NR
Analog beamforming
Digital beamforming
Hybrid beamforming
Note: The physical layer procedure design for NR can be agnostic to UE/TRP with respect to the beamforming implementations employed at TRP/UE, but it may pursue beamforming implementation specific optimization not to lose efficiency
RAN1 studies both multi-beam based approaches and single-beam based approaches for these channels/signals/measurement/feedback
Initial-access signals (synchronization signals and random access channels)
System-information delivery
RRM measurement/feedback
L1 control channel
Others are FFS
Note: The physical layer procedure design for NR can be unified as much as possible whether multi-beam or single-beam based approaches are employed at TRP at least for synchronization signal detection in stand-alone initial access procedure
Note: single beam approach can be a special case of multi beam approach
Note: Individual optimization of single beam approach and multiple beam approach is possible
Multi-beam based approaches
In Multi-beam based approaches, multiple beams are used for covering a DL coverage area and/or UL coverage distance of a TRP/a UE
One example of multi-beam based approaches is beam sweeping:
When beam sweeping is applied for a signal (or a channel), the signal (the channel) is transmitted/received on multiple beams, which are on multiple time instances in finite time duration
Single/multiple beam can be transmitted/received in a single time instance
Others are FFS
Single-beam based approaches
In single-beam based approaches, the single beam can be used for covering a DL coverage area and/or UL coverage distance of a TRP/a UE, similarly as for LTE cell-specific channels/RS
For both single-beam and multi-beam based approaches, RAN1 can consider followings in addition
Power boosting
SFN Repetition
Beam diversity (only for multi-beam approach)
Antenna diversity
Other approaches are not precluded
Combinations of single-beam based and multi-beam based approaches are not precluded Agreements:
RAN1 to study the beamforming procedures and their system impacts at least for multi beam based approach
Physical layer procedures for beamforming optimizing different metrics such as overheads and latencies in multi beam and single beam based approaches
Physical layer procedures in multi beam based approach that require beam training, i.e. steering of transmitter and/or receiver beams
E.g. Periodic/Aperiodic downlink/uplink TX/RX beam sweeping signals, where periodic signals may be semi-statically or dynamically configured (FFS)
E.g. UL sounding signals
Other example is not precluded Agreements:
Both intra-TRP and inter-TRP beamforming procedures are considered.
Beamforming procedures are considered with/without TRP beamforming/beam sweeping and with/without UE beamforming/beam sweeping, according to the following potential use cases:
UE movement, UE rotation, beam blocking:
Change of beam at TRP, same beam at UE
Same beam at TRP, change of beam at UE
Change of beam at TRP, change of beam at UE
Other cases are not precluded With the support of beam operation and TRP, a cell may have multiple choices to schedule a UE. For example, there may be multiple beams from a TRP transmitting the same data to the UE, which can provide more reliability for the transmission. Alternatively, multiple beams from multiple TRPs transmit the same data to the UE. To increase the throughput, it is also possible for a single TRP to transmit different data on different beams for the UE. Also, multiple TRPs can transmit different data on different beams to the UE.

3GPP R2-162252 discusses the possibility of performing beamforming at eNB side and at UE side as follows:

2.5 Beamforming with Antenna Gain

Based on the above observations, the HF-NR system has larger path loss, effective noise power and signal variation than conventional LTE system. To overcome, it is well known that beamforming with antenna gain, shown in FIG. 3, is necessary. These beamforming can be applied for both data and control channel. Beamforming with sharp beam width and high antenna gain is used in both eNB and UE sides. Practically, antenna gain by beamforming in eNB is considered about 15 to 30 dBi. The antenna gain of UE is considered about 3 to 20 dBi.

[ . . . ]

2.6 Less Interferences Due to Sharp Beamforming

In SINR perspective, one good news of sharp beamforming reduces interference power from neighbor interferers, i.e. neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. As being well known in academia, a HF system with beamforming is noise-limited, whereas conventional LTE system is interference limited.

[ . . . ]

As discussed above, physical layer procedures for beamforming require multi-beam based approaches. The network performs beamforming to overcome the higher pathloss in higher frequency. At one time or one symbol time, the network generates part of network beams instead of all network beams duo to the limit of analog or hybrid beamforming. For transmission scheduling, the network requires the beam information of a UE, such as which network beams are qualified for the UE. The network beam with qualified channel quality may mean the beam(s) with RSRP (Reference Signal Received Power) or SINR (Signal to Interference plus Noise Ratio) larger than some thresholds or the beam(s) with pathloss smaller than some thresholds. Alternatively, the network beam with qualified channel qualify may mean the beam(s) with RSRP or SINR or PL (absolute) difference smaller than some thresholds comparing to the network beam with the best channel quality. The network may perform beam sweeping on SRS (Sounding Reference Signal) to get the qualified network beam information of a UE. Alternatively, a UE can perform network beam measurement, and then report the qualified network beam information to network.

Similarly, the UE may possibly have the capability to performing beamforming to get more power gain. When UE beamforming is applied, the network beam and the UE beam should be matched for successful transmission and reception. The UE should know to utilize which UE beam(s) for DL (Downlink) reception and UL (Uplink) transmission. The UE beam set, including the UE beam(s) which is matched to qualified network beam(s), may be obtained via measuring DL reference signal for network beamforming (e.g., BRS). For DL reception, one direction is that the UE autonomous adjusts UE beamforming at each reception occasion, which may be applied on digital beamforming at UE side. Another direction is that the UE periodically updates UE beam set and utilized the UE beam set for a time period. It is assumed that the mapping between network beam and UE beam is kept for one or multiple times of BRS periodicity (e.g., 10 ms~100 ms). The direction may be applied on hybrid or analog beamforming at UE side. In general, the operating concept may be:

1. The UE measures DL reference signal for beam tracking/beam finding with (fixed) UE beamforming sweeping to find the mapping between network beam(s) and UE beam(s).
2. (Optional) The UE may autonomous fine-tune the UE beamforming to get better network beam quality without changing the mapping between network beam(s) and UE beam(s).
3. If the measurement on the DL reference signal for beam tracking/beam finding shows that the mapping between network beam(s) and UE beam(s) is changed, the UE updates the mapping and may report the mapping to network.

Figure 6:
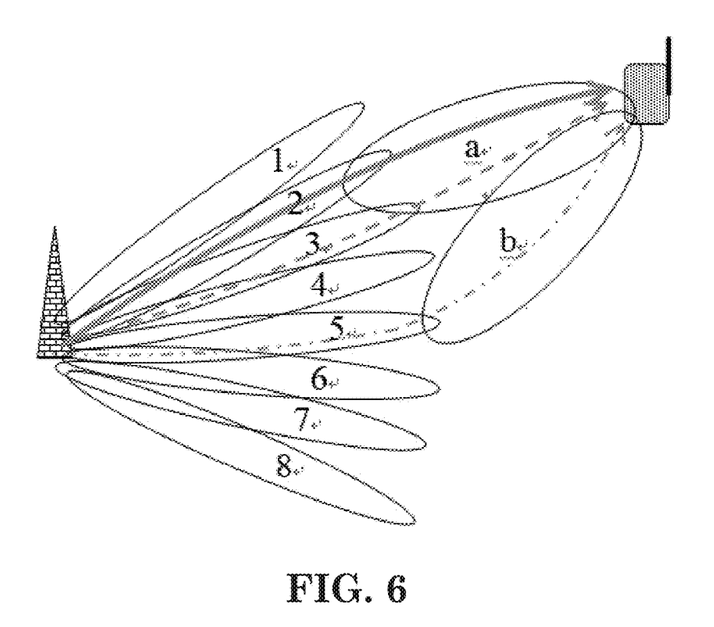
FIG. 6 is a diagram according to one exemplary embodiment.

As illustrated in exemplary FIG. 6, network beam 2 and beam 3 are mapped to UE beam a, and network beam 5 is mapped to UE beam b. The network and the UE may perform DL/UL transmission and reception based on the mapping between network beams and UE beams. To have scheduling flexibility, the network may utilize different network beams for DL transmission or UL reception from time to time. However, to keep the connection between network and UE, a specific network beam and a specific UE beam can be considered as a fallback beam. The specific network beam may be the one network beam with the best channel quality. The specific UE beam is the one UE beam mapped to the specific network beam. For some UL instances, the UE may assume that the network uses at least the specific network beam for reception, e.g., of SR (Scheduling Request) and UE beam reporting. For some DL instances, the UE may assume that the network uses at least the specific network beam for transmission, e.g., DL control signaling. In the exemplary embodiment shown in FIG. 6, the specific network beam is network beam 2, and the specific UE beam is UE beam a.

As for DL or UL data transmission(s), the network may utilize network beams different from the network beams for DL control signaling. Accordingly, the data transmission may perform on UE beam(s) different from the UE beam(s) for receiving DL control signaling. As shown in the exemplary embodiment of FIG. 6, the UE may receive DL control channel on UE beam a and receive associated scheduled DL data transmission on UE beam b, which generally gives scheduling flexibility for utilizing all qualified network beams. The network requires the mapping information between network beam(s) and UE beam(s). The DL control signaling may indicate which UE beam(s) is utilized for corresponding data transmission or reception. For the transmission without control signaling, the UE beam(s) may be indicated or configured in advance, e.g., in higher layer signaling.

Figure 7:
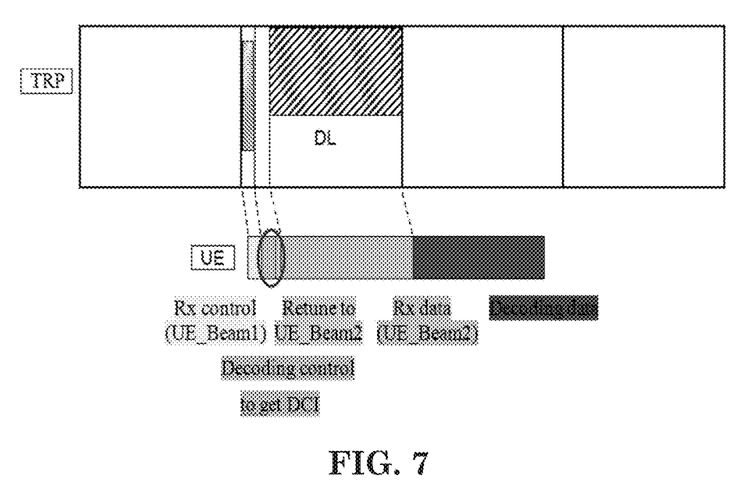
FIG. 7 is a according to one exemplary embodiment.

If DL control channel and DL data channel are TDM (Time Division Multiplex), the UE may receive an indication of UE beam(s) for data reception from the DL control signaling. Considering the latency due to blind decoding on DL control signaling, the frame structure should ensure the UE adjusts/switches the UE beam(s) for DL data reception in time. FIG. 7 illustrates an exemplary embodiment for the required UE process time.

Thus, the UE requires a time interval between DL control signaling and the associated DL data transmission, to cover the required time of decoding control signaling and retuning UE beam(s). From the UE side, the UE receives the associated DL data transmission scheduled by the control signaling with a time delay after receiving the control signaling. The time delay may mean the additional time interval for receiving the DL data transmission after receiving the control signaling, comparing the case that the UE requires performing UE beamforming adjustment/switch and the case that the UE does not require performing UE beamforming adjustment/switch. Alternatively, the time delay could be a time interval for receiving the DL data transmission after receiving the control signaling no matter UE requires or does not require performing UE beamforming adjustment/switch. In addition, the UE may generate at most one UE beam in one time instance. Alternatively, the UE may have capability to generate more than one UE beam in one time instance.

Some general approaches are listed and discussed below:
1. Insert a timing gap, e.g. one or some symbols time, between DL control channel and DL data channel—The timing gap may be specified or configured. However, it may induce different frame structures for the UE with UE beamforming and the UE without UE beamforming. It makes the system design more complex.
2. Insert a channel between DL control channel and DL data channel—For instance, inserting an UL control channel.
3. Set a timing association between DL control channel and DL data channel—The timing association may induce that the DL control channel and the associated DL data channel could be transmitted in different TTI(s)/subframe(s). Alternatively, the timing association between the control signaling and the data transmission could be some symbol time wherein the control signaling and the data transmission are received within one TTI(s)/subframe(s).
4. If the DL data transmission is indicated on UE beam(s) different from where to receive the DL control signaling, the UE considers that the DL data transmission starts from a later symbol time—For instance, the DL data transmission on different UE beam(s) starts from the second or the third symbol time of the DL data channel. The DL data transmission on UE beam(s), which is the same as where to receive the DL control signal, starts from the first symbol time of the DL data channel. From the UE side, the UE starts to receive the DL data transmission from the second or the third symbol time of the DL data channel if the DL data transmission is on UE beam(s) different from where to receive the DL control signaling. The UE starts to receive the DL data transmission from the first symbol time of the DL data channel if the DL data transmission is on UE beam(s), which is the same as where to receive the DL control signal.
5. The UE assumes that the UE beam does not require switch or adjustment for receiving DL control channel and associated scheduled DL data channel—As shown in FIG. 6 for example, if the UE is capable to generate one UE beam at one time, the UE receives both DL control channel and associated scheduled DL data channel on UE beam a. Furthermore, for other types of transmissions, it may be possible that the UE utilizes the same UE beam(s) for receiving DL transmission and transmitting UL transmission, e.g., SR, aperiodic CQI (Channel Quality Indicator), periodic CQI, DL/UL HARQ-ACK (Hybrid Automatic Repeat Request-Acknowledgement), SPS (Semi-Persistent Scheduling) DL/UL data transmission, DL/UL data transmission, etc. More specifically, it means that UE beam(s) does not require switch or changed for receiving DL transmission and transmitting UL transmission. The UE beam(s) is changed or switched when the UE performs UE beam tracking via measuring DL reference signal for network beamforming, e.g., BRS (Beam Reference Signal). Moreover, it is possible that the UE does not require reporting the mapping between network beam(s) and UE beam(s) to network. The UE does not require reporting which UE beam(s) are utilized for receiving DL transmission and transmitting UL transmission. Accordingly, the qualified network beams may be restricted by the one or multiple UE beam(s) that the UE can generate simultaneously. The network beams not capable of being received on the one or multiple UE beam(s) are considered as not qualified. As illustrated in FIG. 6 for example, if the UE is capable to generate one UE beam at one time, the UE reports network beam 2 and network beam 3 as qualified network beams. Network beam 5 is not reported as qualified network beam even though network beam 5 is with qualified channel quality when UE performs beamforming on beam b. It is because that the UE is not capable to generate UE beam a and UE beam b simultaneously, thus it is meaningless and helpless to report network beam 5 as qualified network beam. Then, the UE utilizes UE beam a for receiving DL transmission and transmitting UL transmission. This approach simplifies the UE beamforming with some loss on scheduling flexibility.

In one embodiment, the UE detects channel quality of network beams from measuring reference signal, e.g., DL reference signal for network beamforming. And the UE determines a set of UE beam(s), wherein the set of UE beam(s) comprises at least the UE beam which is mapped to the network beam with the best channel quality. The determined set of UE beam(s) are utilized for UE transmission and reception. The UE may report a set of network beams, wherein the network beam within the set of network beams is with qualified channel quality and is mapped to the determined set of UE beam(s). More specifically, the UE does not report the network beams which are not mapped to the determined set of UE beam(s) even if the network beams are with qualified channel quality. Moreover, the UE does not report the set of UE beam(s). The UE does not report the mapping between the set of network beam(s) and the set of UE beam(s). Furthermore, the number of UE beams within the set of UE beam(s) is restricted by the UE capability. Alternatively, the UE beams within the set of UE beam(s) is restricted by one or multiple UE beam(s) which the UE can generate simultaneously at one time Considering that the network may perform beam tracking via SRS, wherein aperiodic/periodic SRS may be transmitted on multiple UE beams which are on multiple time instances in finite time duration. The network may require indicating on which UE beam(s) the UE performs DL reception and UL transmission, in order to ensure the qualified network beam(s) can be utilized for communication with the UE.

Figure 8:
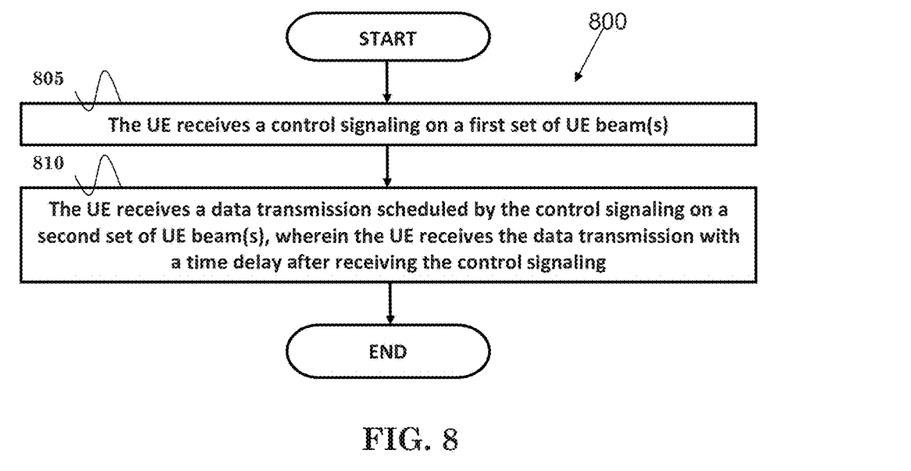
FIG. 8 is a flow chart according to one exemplary embodiment from the perspective of a UE.

FIG. 8 is a flow chart 800 according to one exemplary embodiment from the perspective of a UE. In step 805, the UE receives a control signaling on a first set of UE beam(s).

In step 810, the UE receives a data transmission scheduled by the control signaling on a second set of UE beam(s), wherein the UE receives the data transmission with a time delay after receiving the control signaling. In one embodiment, the UE performs UE beamforming adjustment/switch, within the time delay, from the first set of UE beam(s) to the second set of UE beam(s). In one embodiment, the control signaling indicates the second set of UE beam(s) for the data transmission.

In one embodiment, the time delay could mean an additional time interval for receiving the data transmission after receiving the control signaling for a case where the first set of UE beam(s) and the second set of UE beam(s) are different in comparison to a case where the first set of UE beam(s) and the second set of UE beam(s) are the same. Alternatively, the time delay could mean an additional time interval for receiving the data transmission after receiving the control signaling for a case where the UE requires performing UE beamforming adjustment/switch from the first set of UE beam(s) to the second set of UE beam(s) in comparison to a case where the UE does not require performing UE beamforming adjustment/switch from the first set of UE beam(s) to the second set of UE beam(s).

In one embodiment, the time delay could be a specified or configured timing gap. The time delay could be one or multiple symbol times. Furthermore, the time delay could be a time interval for receiving the DL data transmission after receiving the control signaling regardless of whether the first set of UE beam(s) and the second set of UE beam(s) are different or the same. In addition, the time delay could be a time interval for receiving the DL data transmission after receiving the control signaling regardless of whether the UE requires or does not require performing UE beamforming adjustment/switch from the first set of UE beam(s) to the second set of UE beam(s).

Furthermore, the time delay could be a timing association between the control signaling and the data transmission. In one embodiment, the timing association between the control signaling and the data transmission could induce the control signaling and the data transmission to be received in different TTI(s)/subframe(s). Furthermore, the timing association between the control signaling and the data transmission is a symbol time wherein the control signaling and the data transmission are received within a TTI (Transmission Time Interval) or a subframe.

In one embodiment, if the first set of UE beam(s) and the second set of UE beam(s) are different, the UE would receive the data transmission starting from a later symbol time of a data channel which delivers the data transmission. Furthermore, if the UE requires performing UE beamforming adjustment/switch from the first set of UE beam(s) to the second set of UE beam(s), the UE would receive the data transmission starting from a later symbol time of a data channel which delivers the data transmission. In one embodiment, the later symbol time of the data channel could be a second or a third symbol time of the data channel.

In one embodiment, if the first set of UE beam(s) and the second set of UE beam(s) are the same, the UE would receive the data transmission starting from a first symbol time of a data channel which delivers the data transmission. Furthermore, if the UE does not require performing UE beamforming adjustment/switch from the first set of UE beam(s) to the second set of UE beam(s), the UE would receive the data transmission starting from a first symbol time of a data channel which delivers the data transmission.

Referring back to FIGS. 3 and 4, in one exemplary embodiment of a UE, the device 300 includes a program code 312 stored in the memory 310. The CPU 308 could execute program code 312 to enable the UE (i) to receive a control signaling on a first set of UE beam(s), and (ii) to receives a data transmission scheduled by the control signaling on a second set of UE beam(s), wherein the UE receives the data transmission with a time delay after receiving the control signaling. Furthermore, the CPU 308 can execute the program code 312 to perform all of the above-described actions and steps or others described herein.

Figure 9:
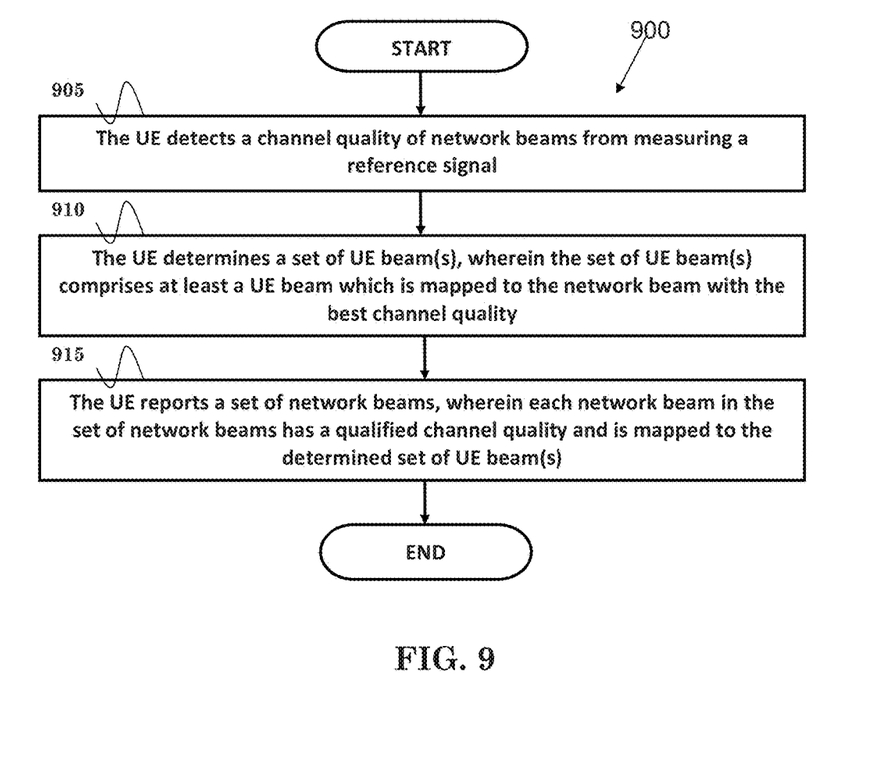
FIG. 9 is a flow chart according to one exemplary embodiment from the perspective of a UE.

FIG. 9 is a flow chart 900 according to one exemplary embodiment from the perspective of a UE. In step 905, the UE detects a channel quality of network beams from measuring a reference signal. In one embodiment, the reference signal could be a DL reference signal for network beamforming. The reference signal could also be a BRS (Beam Reference Signal).

In step 910, the UE determines a set of UE beam(s), wherein the set of UE beam(s) comprises at least a UE beam which is mapped to the network beam with the best channel quality. In one embodiment, the determined set of UE beam(s) is used for UE transmission and reception. Furthermore, the number of UE beams within the set of UE beam(s) is restricted by the UE capability. For example, the UE beams in the determined set of UE beam(s) could be restricted by a number of UE beam(s) that the UE can generate simultaneously.

In step 915, the UE reports a set of network beams, wherein each network beam in the set of network beams has a qualified channel quality and is mapped to the determined set of UE beam(s).

In one embodiment, the UE does not report the set of UE beam(s). In particular, the UE does not report the mapping between the set of network beam(s) and the set of UE beam(s). In one embodiment, the UE does not report the network beams which are not mapped to the determined set of UE beam(s) even if the network beams have qualified channel quality.

In one embodiment, a network beam with qualified channel quality could mean the network beam with RSRP or SINR larger than some thresholds or the network beam with pathloss smaller than some thresholds. Alternatively, a network beam with qualified channel quality means the network beam has a RSRP (Reference Signal Received Power), a SINR, or a PL (PathLoss) difference smaller than a threshold in comparison to the qualified network beam with the best channel quality.

Referring back to FIGS. 3 and 4, in one exemplary embodiment of a UE, the device 300 includes a program code 312 stored in the memory 310. The CPU 308 could execute program code 312 to enable the UE (i) to detect a channel quality of network beams from measuring a reference signal, (ii) to determine a set of UE beam(s), wherein the set of UE beam(s) comprises at least a UE beam which is mapped to the network beam with the best channel quality, and (iii) to report a set of network beams, wherein each network beam in the set of network beams has a qualified channel quality and is mapped to the determined set of UE beam(s). Furthermore, the CPU 308 can execute the program code 312 to perform all of the above-described actions and steps or others described herein.

Figure 10:
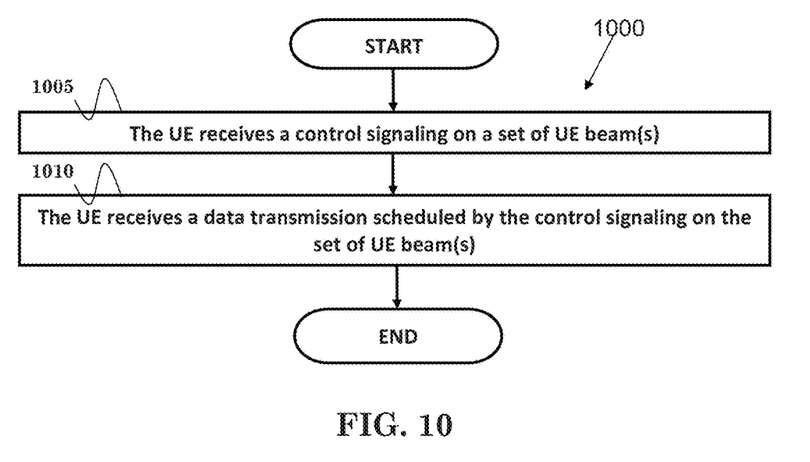
FIG. 10 is a flow chart according to one exemplary embodiment from the perspective of a UE.

FIG. 10 is a flow chart 1000 according to one exemplary embodiment from the perspective of a UE. In step 1005, the UE receives a control signaling on a set of UE beam(s). In one embodiment, the UE could use the set of UE beam(s) for receiving DL transmission and transmitting UL transmission. Furthermore, the DL transmission and the UL transmission could comprise of a SR, an aperiodic CQI, aperiodic CQI, a DL/UL HARQ-ACK, a SPS DL/UL data transmission, and/or a DL/UL data transmission.

In one embodiment, the UE does not switch or change the set of UE beam(s) for receiving DL transmission and transmitting UL transmission. However, the set of UE beam(s) could be changed or switched when the UE performs UE beam tracking via measuring a DL reference signal for network beamforming. In addition, the DL reference signal for network beamforming could be a BRS.

In step 1010, the UE receives a data transmission scheduled by the control signaling on the set of UE beam(s). In one embodiment, the control signaling and the data transmission may be transmitted on different network beam(s).

In one embodiment, the UE does not report the mapping between network beam(s) and UE beam(s) to network. In addition, the UE does not report which UE beam(s) belongs to the set of UE beam(s).

In one embodiment, the qualified network beams could be restricted by the set of UE beam(s). For example, the qualified network beams could be restricted by the number of UE beam(s) that the UE could generate simultaneously at one time.

In one embodiment, the network beams, which are not capable of received on the set of UE beam(s), are considered as not qualified. Furthermore, the set of UE beam(s) could comprise at least the UE beam which is mapped to the network beam with the best channel quality.

Referring back to FIGS. 3 and 4, in one exemplary embodiment of a UE, the device 300 includes a program code 312 stored in the memory 310. The CPU 308 could execute program code 312 to enable the UE (i) to receive a control signaling on a set of UE beam(s), and (ii) to receive a data transmission scheduled by the control signaling on the set of UE beam(s). Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment) capable of performing UE beamforming, comprising:
   receiving a control signaling on a first set of UE beam(s); and
   receiving a data transmission scheduled by the control signaling on a second set of UE beam(s), wherein when the first set of UE beam(s) and the second set of UE beam(s) are the same, the UE receives the data transmission starting from a first symbol time of a data channel which delivers the data transmission, and when the first set of UE beam(s) and the second set of UE beam(s) are different, the UE receives the data transmission starting from a symbol time later than the first symbol of the data channel which delivers the data transmission.

2. The method of claim 1, wherein the control signaling indicates the second set of UE beam(s) for the data transmission.

3. The method of claim 1, wherein the UE performs UE beamforming adjustment/switch, within a time delay after receiving the control signaling, from the first set of UE beam(s) to the second set of UE beam(s).

4. The method of claim 3, wherein the time delay means an additional time interval for receiving the data transmission after receiving the control signaling for a case where the first set of UE beam(s) and the second set of UE beam(s) are different in comparison to a case where the first set of UE beam(s) and the second set of UE beam(s) are the same.

5. The method of claim 3, wherein the time delay means an additional time interval for receiving the data transmission after receiving the control signaling for a case where the UE requires performing UE beamforming adjustment/switch from the first set of UE beam(s) to the second set of UE beam(s) in comparison to a case where the UE does not require performing UE beamforming adjustment/switch from the first set of UE beam(s) to the second set of UE beam(s).

6. The method of claim 3, wherein the time delay is a specified or configured timing gap, which is one or multiple symbol times.

7. The method of claim 3, wherein the time delay is a timing association between the control signaling and the data transmission.

8. The method of claim 7, wherein the timing association between the control signaling and the data transmission is a symbol time wherein the control signaling and the data transmission are received within a TTI (Transmission Time Interval) or a subframe.

9. The method of claim 1, wherein when the UE requires performing UE beamforming adjustment/switch from the first set of UE beam(s) to the second set of UE beam(s), the UE receives the data transmission starting from the symbol time later than the first symbol of the data channel.

10. The method of claim 1, wherein the symbol time later than the first symbol of the data channel is a second or a third symbol time of the data channel.

11. The method of claim 1, wherein when the UE does not require performing UE beamforming adjustment/switch from the first set of UE beam(s) to the second set of UE beam(s), the UE receives the data transmission starting from the first symbol time of the data channel.

12. A User Equipment, in the following also referred to as UE, comprising:
   a control circuit;
   a processor installed in the control circuit; and
   a memory installed in the control circuit and coupled to the processor;
   wherein the processor is configured to execute a program code stored in the memory to:
      receive a control signaling on a first set of UE beam(s); and
      receive a data transmission scheduled by the control signaling on a second set of UE beam(s), wherein when the first set of UE beam(s) and the second set of UE beam(s) are the same, the UE receives the data transmission starting from a first symbol time of a data channel which delivers the data transmission and when the first set of UE beam(s) and the second set of UE beam(s) are different, the UE receives the data transmission starting from a symbol time later than the first symbol of the data channel which delivers the data transmission.

* * * * *